Patented Feb. 14, 1939

2,147,549

UNITED STATES PATENT OFFICE 2,147,549

PROCESS FOR THE MANUFACTURE OF A FOOD PRODUCT FROM COCOA POWDER, GRAPE SUGAR (DEXTROSE), AND MINERAL SALTS

Ludwig Roselius, Bremen, Germany

No Drawing. Application March 8, 1938, Serial No. 194,707. In the Netherlands March 17, 1937

1 Claim. (Cl. 99—23)

It is known that in preparing a finished thickish beverage of cocoa powder with water or milk it is expediently necessary to boil up the beverage.

It has now been found that a chocolate flavoured food product containing cocoa which can be consumed immediately after infusion with hot water can be prepared by means of trituration of the cocoa powder with other suitable substances and mixing and swelling up by means of a special grinding process together with these substances.

It has been found expedient to undertake the mixing of the cocoa powder with yellow raw ground sugar and hygroscopic mineral-salts together with grape-sugar (dextrose). By means of intense grinding of the aforementioned ingredients the cocoa powder is loosened up permitting the preparation of a beverage without the cocoa powder having to be decomposed by cooking for a length of time. In addition the preparation of the chocolate flavoured food product being the object of the present invention is made possible by means of a cold process contrary to the usual melting process in preparing chocolate. The melting process has the disadvantage of both requiring a considerable expenditure and use of power and also the undesirable decomposition of the hygroscopic mineral-salts which for the present purpose is even more important. The manufacture of the chocolate flavoured product being the object of the present invention in a cold manner is effected by a combination through most intense mixing of cocoa powder with raw ground sugar and the hygroscopic mineral-salts and the addition of grape-sugar for improving the digestibility by means of suitable mills and mixing and grinding machines.

Presumably the moisture inherent to raw ground sugar effects the permanent binding of the cocoa powder to the sugar particles in the process of grinding the entire mixture. Inasmuch as the mineral particles and the raw ground sugar continuously remain somewhat moist, particularly the latter on account of its strong hygroscopic qualities which causes it to continuously absorb moisture from the atmosphere, they cause a combination of the cocoa powder with the sugar particles to take place so that subsequent disintegration is quite impossible, and therefore the product represents a perfect chocolate possessing in particular the typical chocolate flavour. Cocoa powder readily combines with other substances wherefore it only requires a comparatively small degree of moisture which by no means can damage the quality of the product, particularly with regard to flavour and the strength of the infusion. The combination of the cocoa powder with the sugar particles, as described, also prevents lumping of the thus prepared chocolate powder.

*Example*

40 parts cocoa powder are intensely mixed with 20 parts grape-sugar (dextrose), 30 parts yellow raw ground sugar and 10 parts hygroscopic mineral-salts in suitable mixing and triturating machines with the addition of spices.

I claim:

A process for the manufacture of an agreeable thickish chocolate powder consisting in most intense mixing and grinding of cocoa powder by triturating with yellow raw ground sugar and hygroscopic mineral-salts in presence of grape-sugar.

LUDWIG ROSELIUS.